United States Patent
Komatsu et al.

[11] Patent Number: 5,854,708
[45] Date of Patent: Dec. 29, 1998

[54] ANTI-FOG ELEMENT

[75] Inventors: Toru Komatsu, Shimada; Masatoshi Nakamura, Fujieda, both of Japan

[73] Assignee: Murakami Corporation, Japan

[21] Appl. No.: 897,291

[22] Filed: Jul. 21, 1997

[30] Foreign Application Priority Data

Jul. 26, 1996 [JP] Japan .................................. 8-215212

[51] Int. Cl.$^6$ .................................................. G02B 5/08
[52] U.S. Cl. ........................ 359/512; 359/507; 359/509
[58] Field of Search .............................. 359/507, 509, 359/512, 601–609

[56] References Cited

U.S. PATENT DOCUMENTS

| | | | |
|---|---|---|---|
| 4,634,242 | 1/1987 | Taguchi et al. | 359/512 |
| 5,148,311 | 9/1992 | Beavers et al. | 359/507 |
| 5,446,576 | 8/1995 | Lynam et al. | 359/604 |

FOREIGN PATENT DOCUMENTS

| | | |
|---|---|---|
| 0545258 | 6/1993 | European Pat. Off. . |
| 0689962 | 1/1996 | European Pat. Off. . |
| 4-365001 | 12/1992 | Japan .................................. 359/507 |
| WO 80/02678 | 12/1980 | WIPO .................................. 359/512 |

OTHER PUBLICATIONS

Patent Abstract of Japanese Reference No. 88–158890, vol. 96, No. 10, Oct. 31, 1996.

"Pt–TiO$_2$ Thin Films On Glass Substrate As Efficient Catalysts", by M. Takahashi, Journal of Materials Science, vol. 24, No. 1, Jan. 1989 (pp. 243–246).

*Primary Examiner*—Thong Nguyen
*Attorney, Agent, or Firm*—Hedman, Gibson & Costigan, P.C.

[57] ABSTRACT

An anti-fog element includes a transparent substrate such as a glass substrate, a transparent film of a photocatalyzer such as TiO$_2$ catalyzing a photocatalytic reaction on the transparent substrate, and a film of a transparent porous inorganic oxide such as SiO$_2$ formed on the film of the photocatalyzer and having a surface exhibiting a hydrophilic property. Organic matters etc. deposited in openings of the porous inorganic oxide film are dissolved and removed by a photocatalytic reaction caused by light excitation of the photocatalyzer film whereby the anti-fog property of the anti-fog element can be maintained over a long period of time.

11 Claims, 7 Drawing Sheets

# ANTI-FOG ELEMENT

BACKGROUND OF THE INVENTION

This invention relates to an anti-fog element imparted with an anti-fog property by forming a porous inorganic oxide film on the surface of a substrate such as a glass substrate and thereby making the surface hydrophilic and, more particularly, to an anti-fog element capable of preventing decrease in the hydrophilic property and thereby maintaining the anti-fog property over a long period of time.

As an anti-fog element imparted with an anti-fog property by forming a porous inorganic oxide film on the surface of a substrate such as a glass substrate, the applicant of the present invention has proposed an anti-fog element disclosed by Japanese Patent Application Laid-open No. Hei-8-11631 (U.S. Pat. No. 5,594,585, European Patent Application No. 95109548.8). This anti-fog element is provided, as shown in the enlarged section of FIG. 2, by forming on a substrate 10 such as a glass substrate an inorganic oxide film 12 of an oxide such as $SiO_2$ by a PVD method such as ion plating or sputtering and thereby making the surface thereof hydrophilic. According to the proposed invention, wetting property of the surface of the film is improved by reason of the capillary phenomenon and the hydrophilic property and anti-fog property of the film thereby are improved. Therefore, by applying the proposed invention to automobile outer mirrors, bathroom mirrors, automobile windows and window panes etc., the tendency that a waterdrop deposited on the surface exhibits a globular shape is reduced whereby visibility is improved.

Differences in the behaviour of a waterdrop deposited on a mirror surface between a case where a porous inorganic oxide film is formed on the surface and a case where no such film is formed is shown in FIGS. 3A and 3B. FIG. 3A shows the case where no porous inorganic oxide film is formed. A waterdrop 14 is deposited in a globular form on the water repellent mirror surface (i.e., the surface of the glass substrate 10). In this state, the waterdrop 14 is a small hemisphere having a small radius of curvature and, therefore, an image behind the mirror is inverted due to the lens effect. This causes a bright image such as the sky and street lights to be reflected on the lower half of the waterdrop 14 and thereby makes it difficult to see such a bright image.

In contrast, when the porous inorganic oxide film 12 is formed as shown in FIG. 3B, the waterdrop 14 deposited on the mirror surface (the surface of the porous inorganic oxide film 12) spreads in a thin film state. This makes it difficult to produce the lens effect and, therefore, a decrease in visibility can be prevented notwithstanding that the waterdrop 14 is deposited on the mirror surface. Moreover, by such spreading of the waterdrop 14 in the form of a thin film, the area of contact between the waterdrop 14 and air increases and this enhances evaporation of water.

In a case where the anti-fog element shown in FIG. 2 is applied to, for example, an automobile outer mirror and a solid or liquid wax is erroneously applied on the surface of the porous inorganic oxide film 12, openings of the porous film are filled with the wax to become a flat surface with the result that the hydrophilic property and therefore the anti-fog property of the anti-fog element is lost. In this case, it becomes necessary to clean the openings of the porous film with a cleaning agent but this tends to cause reduction in the quality of the anti-fog element due to scratches etc. Further, by use of the anti-fog element over a long period of time, organic materials and $NO_x$ in the air are deposited in the openings with a resulting decrease in the hydrophilic property and the anti-fog property.

It is, therefore, an object of the invention to provide an anti-fog element which has overcome the above described problem in the prior art anti-fog element and is capable of preventing a decrease in the hydrophilic property and maintaining the anti-fog property over a long period of time.

SUMMARY OF THE INVENTION

The anti-fog element according to the invention comprises a transparent substrate, a transparent film of a photocatalyzer catalyzing a photocatalytic reaction formed on the transparent substrate and a transparent porous inorganic oxide film formed on the film of the photocatalyzer and having a surface exhibiting a hydrophilic property.

The term "photocatalytic reaction" used herein means the phenomenon that, when a semiconductor such as $TiO_2$ is excited with light of a wavelength having energy exceeding its band gap, electron-hole pairs are produced in the semiconductor and these electron-hole pairs brought to the surface of the semiconductor cause an oxidation-reduction reaction in substance deposited on the surface of the semiconductor. Holes of $TiO_2$ excited by light have such a strong oxidizing power that an organic matter deposited on the surface of $TiO_2$ is dissolved and removed by the photocatalytic reaction.

According to the present invention, therefore, organic matters such as wax and $NO_x$ which are deposited in openings of the porous inorganic oxide film are dissolved and removed by the photocatalytic reaction caused by the photocatalyzer film. Accordingly, a decrease in the hydrophilic property is prevented and the anti-fog property can be maintained over a long period of time.

As materials of the inorganic oxide film used in the invention, metal oxides such as $SiO_2$ and $Al_2O_3$ may be used. Since these metal oxides produce a hydrophilic OH group on their surface, they generally have a hydrophilic property. According to experiments made by the inventor of the present invention, $SiO_2$ exhibited the greatest hydrophilic property.

As materials of the photocatalyzer film used in the invention, semiconductors such as $TiO_2$, $ZnO$, $SnO_2$, $ZnS$ and $CdS$ may be used. Among these materials, $TiO_2$ is the best suited photocatalyzer in terms of reactivity, durability and safety.

The photocatalytic reaction can be produced efficiently if openings of the porous inorganic oxide film are formed to reach the surface of the photocatalyzer film so that organic matters and $NO_x$ entering the openings are brought into direct contact with the surface of the photocatalyzer film. In case some material such as $SiO_2$ is selected as the inorganic oxide film and some material such as $TiO_2$ is selected as the photocatalyzer film, organic matters and $NO_x$ entering the openings of the porous inorganic oxide film and being deposited therein can be dissolved and removed by the photocatalytic reaction even if the openings do not reach the surface of the photocatalyzer film, i.e., even if these openings are closed before they reach the surface of the photocatalyzer film, since light which causes the photocatalytic reaction (mainly ultraviolet ray in case $TiO_2$ is used) penetrates through the transparent porous inorganic oxide film and the electrons and holes produced in the photocatalyzer film penetrate through the porous inorganic oxide film.

As regards thickness of the photocatalyzer film, if the photocatalyzer film is made thicker, a stronger photocatalytic reaction can be obtained. Having regard to the strength of the film, however, a film thickness of about 2,000 angstroms is considered optimum in case a $TiO_2$ is formed by vacuum deposition. As regards thickness of the porous inorganic oxide film, film thickness of about 150 angstroms is considered optimum in case a SiO$_2$ film is formed by vacuum deposition so as not to close openings of the porous film, i.e., so as to form the openings to reach the surface of the photocatalyzer film, though this thickness can vary depending upon the speed of vacuum deposition. An adequate hydrophilic property can be obtained with the thickness of this order. In case the speed of vacuum deposition is higher, the porous inorganic oxide film can be formed with a thickness larger than 150 angstroms without closing openings of the porous film.

By forming the substrate with a transparent substrate material such as a glass substrate, the anti-fog element according to the invention can be used for automobile windows and window panes of buildings. In this case, the photocatalytic reaction can be caused by the sunlight. In case the photocatalyzer film is formed with TiO$_2$, an effect of cutting off ultraviolet rays can be obtained since TiO$_2$ absorbs ultraviolet rays. In case an anti-fog film is formed on the outside of a room or an automobile, an effect of removing raindrops can be obtained. In case an anti-fog film is formed on the inside of a room or an automobile, an effect of removing deposited waterdrops can be obtained. Anti-fog films may be formed both on the outside and inside of the room or automobile.

The anti-fog element of the invention can be used as automobile outer mirrors and bath-room mirrors by forming a reflecting film on the substrate. In the case of the automobile outer mirrors, the photocatalytic reaction can be caused by sunlight. In the case of bath-room mirrors, the photocatalytic reaction can be caused by ultraviolet rays in fluorescent light.

Embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1A:
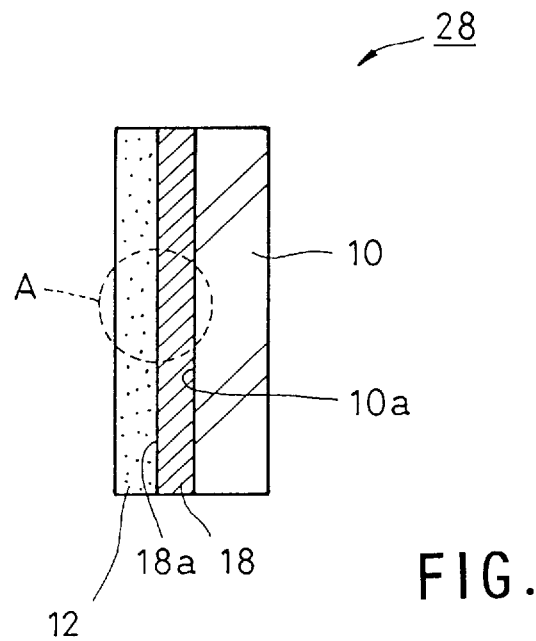
FIG. 1A is a sectional view showing an embodiment of the invention.

An embodiment of the invention is shown in FIG. 1A. On a surface 10$a$ of a transparent substrate 10 such as a glass substrate is formed a transparent photocatalyzer film 18 made of, e.g., TiO$_2$ in the thickness of, e.g., about 1,000 angstroms. On a surface 18$a$ of the photocatalyzer film 18 is formed a transparent inorganic oxide film 12 made of, e.g., SiO$_2$ in the thickness of, e.g., about 150 angstroms. The anti-fog element 28 is therefore transparent (with or without color) in its entirety. The inorganic oxide film 12 is made porous as shown in the enlarged section of FIG. 1B and openings 20 in the porous film reach the surface 18$a$ of the photocatalyzer film 18 whereby the surface 18$a$ of the photocatalyzer film 18 exposed to the openings 20 are exposed to outer air 22.

Figure 1B:
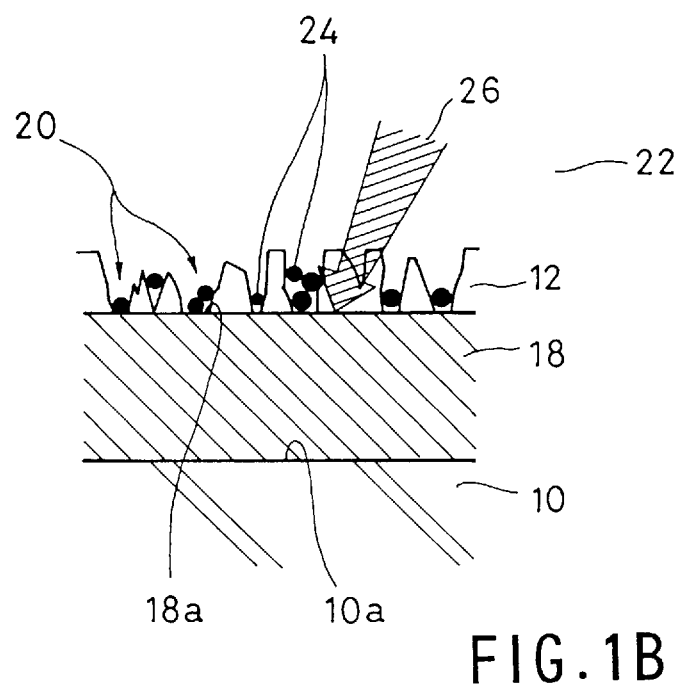
FIG. 1B is an enlarged sectional view of a part of the embodiment.
Figure 2:
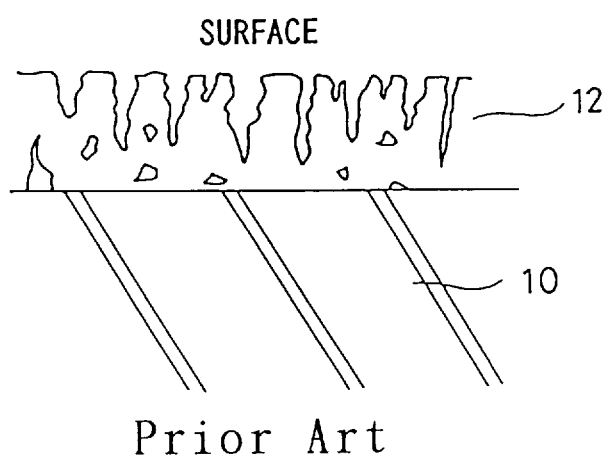
FIG. 2 is sectional view showing a prior art anti-fog element.
Figure 3A:
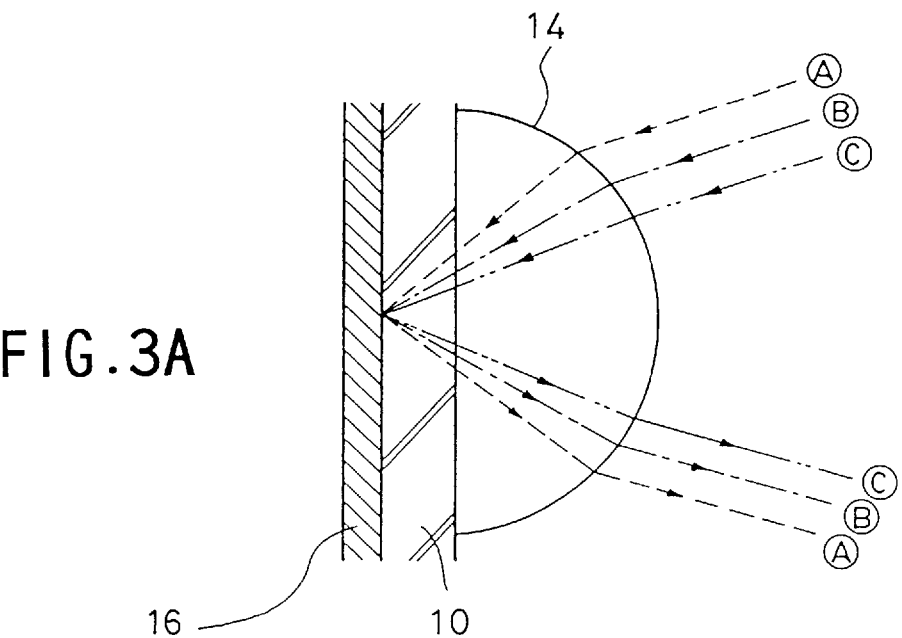
FIGS. 3A and 3B are views for explaining about the anti-fog operation by a porous inorganic oxide film.
Figure 3B:
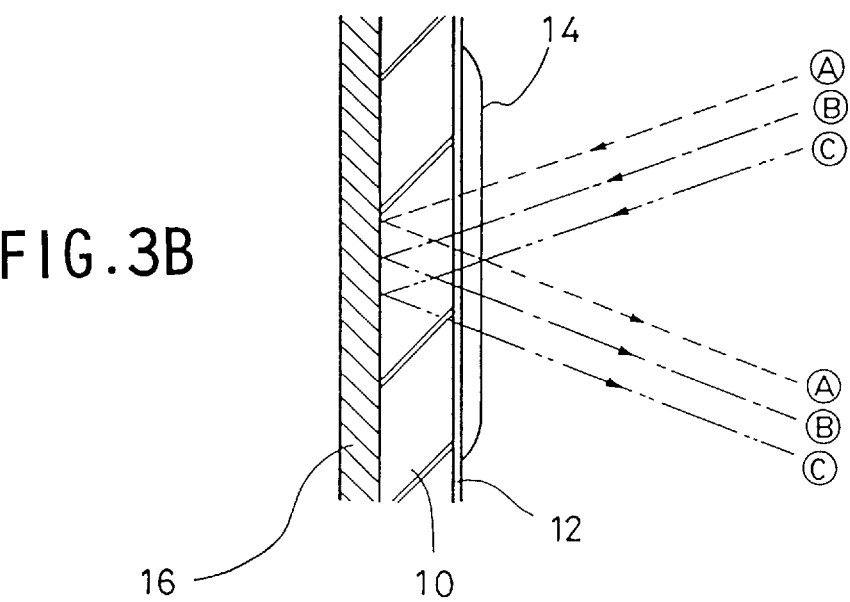

According to this structure, the inorganic oxide film 12 on the surface is made porous and therefore has a hydrophilic property and has an anti-fog effect by spreading deposited waterdrops in a thin film state. Further, as shown in FIG. 1B, in case organic matters such as wax and bacteria and NO$_x$ in the air (hereinafter referred to as "organic matters etc. 24") enter the openings 20 and are deposited therein, the sunlight or other light (such as ultraviolet ray) 26 penetrates through the inorganic oxide film 12 and is irradiated on the photocatalyzer film 18 to excite the photocatalyser film 18. Electron-hole pairs are generated in the photocatalyzer film 18 by virtue of this light excitation and these electron-hole pairs react with the organic matters etc. 24 deposited in the openings 20 to dissolve and remove the organic matters etc. 24 due to oxidation-reduction reaction. Decrease in the hydrophilic property therefore is prevented and the anti-fog property can be maintained over a long period of time.

Figure 4:
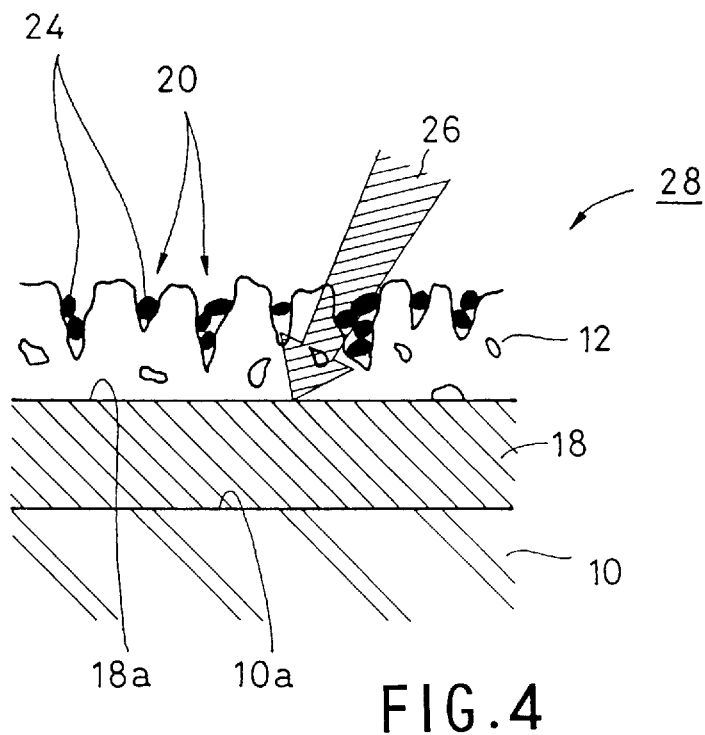
FIG. 4 is an enlarged sectional view of a part of another embodiment.

Another embodiment of the invention is shown in FIG. 4 which is an enlarged sectional view of the portion (a) of FIG. 1A. On a surface 10$a$ of a transparent substrate 10 such as a glass substrate is formed a transparent photocatalyzer film 18 made of, e.g., TiO$_2$ in the thickness of, e.g., about 1,000 angstroms. On a surface 18$a$ of the photocatalyzer film 18 is formed a transparent inorganic oxide film 12 made of, e.g., SiO$_2$ in the thickness of, e.g., about 1,000 angstroms. The anti-fog element 28 therefore is transparent (with or without color) in its entirety. The inorganic oxide film 12 is made porous and its openings 20 do not reach the surface 18$a$ of the photocatalyzer film 18 but are closed in the middle portion of the film.

According to this structure, the inorganic oxide film 12 on the surface is made porous and therefore has a hydrophilic property and has an anti-fog effect by spreading deposited waterdrops in a thin film state. Further, as shown in FIG. 1B, in case organic matters etc. 24 enter the openings 20 and are deposited therein, the sunlight or other light (such as ultraviolet ray) 26 penetrates the inorganic oxide film 12 and is irradiated on the photocatalyzer film 18 to excite the photocatalyzer film 18. Electron-hole pairs are generated by this light excitation and these electron-hole pairs penetrate the inorganic oxide film 12 and react with the organic matters etc. 24 deposited in the openings 20 to dissolve and remove the organic matters etc. 24 due to oxidation-reduction reaction. Decreases in the hydrophilic property therefore can be prevented and the anti-fog property can be maintained over a long period of time.

An example of a method for manufacturing the anti-fog elements 28 shown in FIGS. 1 and 4 will now be described. In this example, the substrate 10 is made of a glass substrate, the photocatalyzer film 18 is made of $TiO_2$ and the inorganic oxide film 12 is made of $SiO_2$. The $TiO_2$ film and the $SiO_2$ film are formed by vacuum deposition.

Figure 5:
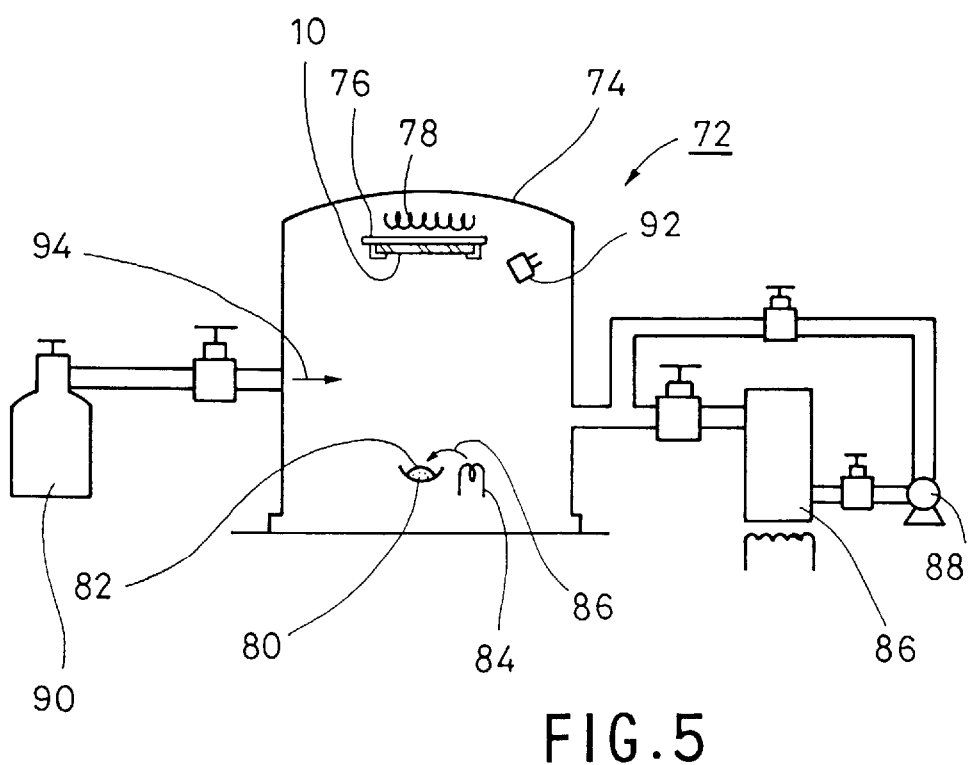
FIG. 5 is a view showing an example of a vacuum deposition apparatus for forming the inorganic oxide film and the photocatalyzer film of the invention.

FIG. 5 shows an example of a vacuum deposition apparatus 72. An inside air in a vacuum tank 74 is exhausted by a diffusion pump 86 and a rotary pump 88. A substrate holder 76 is provided in the upper portion of the vacuum tank 74 and the glass substrate 10 is held by the substrate holder 76 with its film formed surface facing downward. The substrate holder 76 is heated by a heater 78 and the glass substrate 10 is adjusted in temperature to a desired temperature through the substrate holder 76. A crucible 80 is disposed below the glass substrate 10 and material 82 to be deposited (starting material of vacuum deposition) is contained in the crucible 80. As the material 82 to be deposited in the case of forming the $TiO_2$ film, $TiO_2$, $Ti_2O_3$ or Ti may be used. As the material 82 to be deposited in the case of forming the $SiO_2$ film, $SiO_2$ or SiO may be used.

The material 82 to be deposited is evaporated by irradiating an electron beam 86 from a hot cathode 84. As a reactive gas, oxygen gas 94 is introduced into the vacuum tank 74 from an oxygen tank 90. The evaporated material 82 reacts with oxygen to produce $TiO_2$ or $SiO_2$ and this is heaped on the surface of the glass substrate 10 to form the $TiO_2$ film or the $SiO_2$ film. The film thickness is monitored by a film thickness monitor 92 and vacuum deposition is stopped when the film thickness has reached a desired thickness.

It is known that the quality of the deposited film varies depending upon conditions including partial pressure of oxygen gas in the vacuum tank, temperature of the substrate and speed of vacuum deposition. There are a rutile type crystal structure and an anatase type crystal structure in the crystal structure of $TiO_2$. Since the anatase type crystal structure has a larger photocatalytic effect, it is preferable to form the $TiO_2$ film of the anatase type. For forming the $TiO_2$ film of the anatase type, it is preferable to form the $TiO_2$ film 18 on the substrate having a relatively low temperature of about 200° C. (if the temperature of the substrate is higher, the film will become the rutile type).

The $SiO_2$ film 12 can be made porous by increasing the speed of vacuum deposition or increasing partial pressure of the oxygen gas. More specifically, if the speed of vacuum deposition is increased, it becomes difficult to obtain a uniform film and therefore the film tends to have large projections and depressions. If partial pressure of oxygen gas is increased, energy deposited on the surface of the base layer (the surface of the $TiO_2$ film 18 in this case) is reduced and a film having large projections and depressions tends to be formed.

An example of film forming conditions for forming a fine film 18 of $TiO_2$ and a porous film 12 of $SiO_2$ is shown in the following table:

|  | $TiO_2$ film 18 | $SiO_2$ film 12 |
|---|---|---|
| Speed of vacuum deposition | 3 angstroms/sec. | 5 angstroms/sec. |
| Partial pressure of oxygen gas | $1.0 \times 10^{-4}$ torr | $2.0 \times 10^{-4}$ torr |
| Temperature of substrate | 200° C. | 200° C. |

The film forming method may differ between the $TiO_2$ film and the $SiO_2$ film, e.g., the $TiO_2$ film may be formed by sputtering which can form a relatively fine film and the $SiO_2$ film may be formed by vacuum deposition.

An example of film forming processes of the $TiO_2$ film 18 and the $SiO_2$ film 12 by the vacuum deposition apparatus 72 of FIG. 5 will be described below.

(1) The glass substrate 10 is held by the substrate holder 76. As the material 82 to be deposited, $Ti_2O_3$ for example is put in the crucible 80 and the vacuum tank 74 is closed.

(2) The rotary pump 88 and the diffusion pump 86 are driven to make the vacuum tank 74 vacuum.

(3) The heater 78 is driven to heat the glass substrate 10 to a predetermined temperature through the substrate holder 76.

(4) Oxygen is introduced into the vacuum tank 74 from the oxygen tank 90.

(5) the hot cathode 84 is driven to irradiate the electron beam 86 on $Ti_2O_3$ which is the material 82 to be deposited to evaporate it.

(6) The evaporated $Ti_2O_3$ reacts with oxygen to produce $TiO_2$ which is heaped on the glass substrate 10 to form a film.

(7) Forming of the film is stopped when the film has been heaped to the thickness of about 1,000 angstroms.

Upon completion of forming of the $TiO_2$ film 18, forming of the $SiO_2$ film is achieved in the following process:

(1) As the material 82 to be deposited, $SiO_2$ for example is put in the crucible 80 and the vacuum tank 74 is closed.

(2) The rotary pump 88 and the diffusion pump 86 are driven to make the vacuum tank 74 vacuum.

(3) The heater 78 is driven to heat the glass substrate to a predetermined temperature through the substrate holder 76.

(4) Oxygen is introduced into the vacuum tank 74 from the oxygen tank 90.

(5) The hot cathode 84 is driven to irradiate the electron beam 86 on $SiO_2$ which is the material 82 to be deposited to evaporate $SiO_2$.

(6) The evaporated $SiO_2$ is heaped on the $TiO_2$ film 18 on the glass substrate 10 to form a film.

(7) When the film has been heaped to the thickness of about 150 angstroms (in the case of FIG. 1B) or about 1,000 angstroms (in the case of FIG. 4), the film forming is stopped.

EXAMPLES

Examples of the invention will now be described. Examples 1 to 5 (FIGS. 6 to 10) are examples in which the invention is applied to an automobile outer mirror (in FIGS. 7 to 10, illustration of a mirror body is omitted), Examples 6 to 8 (FIGS. 11 to 13) are examples in which the invention is applied to an automobile window (the same is the case when the invention is applied to window panes of a building), and Example 9 is an example in which the invention is applied to a bathroom mirror.

Figure 6:
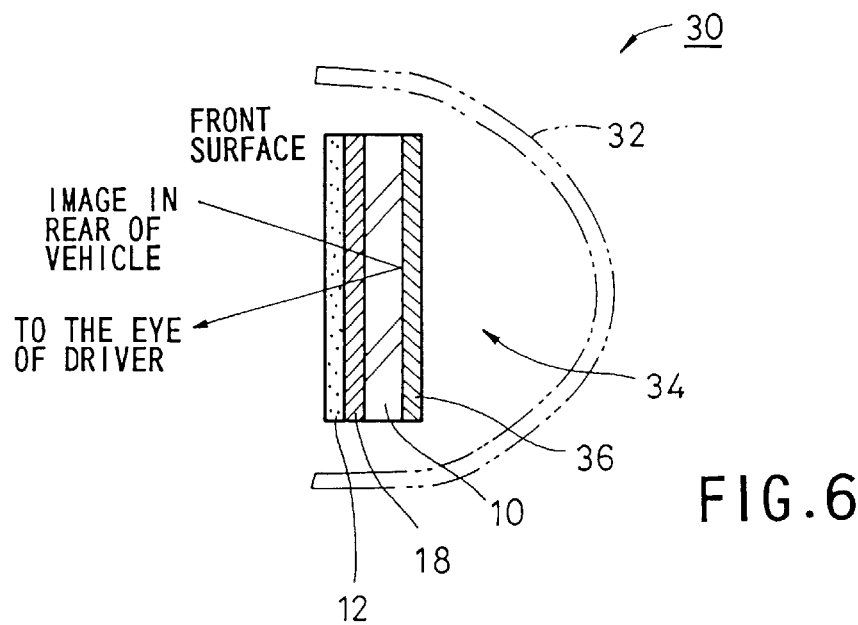
FIG. 6 is a sectional view showing an example (Example 1) in which the invention is applied to an automobile outer mirror.

(1) Example 1 (FIG. 6)

An automobile outer mirror 30 is constructed as a door mirror and a fender mirror. The outer mirror 30 has a mirror body 32 and a mirror assembly 34 housed in the mirror body 32. The mirror assembly 34 has a $TiO_2$ film 18 and a porous $SiO_2$ film 12 formed on the front surface of a transparent glass substrate 10 and has a reflecting film 36 made of Cr or Al formed in the rear surface of the glass substrate 10. An image in the rear of the vehicle penetrates through the $SiO_2$ film 12, $TiO_2$ film 18 and transparent glass substrate 10 and is reflected on the reflecting film 36 to be led to the driver's eye via a reverse path. Organic matters etc. which enter openings of the porous $SiO_2$ film and are deposited therein are dissolved by an oxidation-reduction reaction caused by the photocatalytic reaction on the $TiO_2$ film 18.

Figure 7:
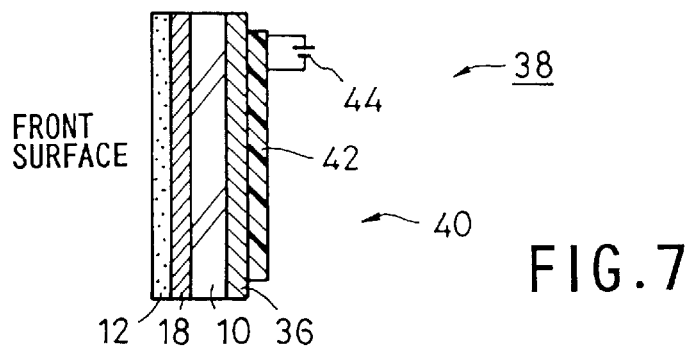
FIG. 7 is a sectional view showing an example (Example 2) in which the invention is applied to an automobile outer mirror.

(2) Example 2 (FIG. 7)

A mirror assembly 40 of an automobile outer mirror 38 has a $TiO_2$ film 18 and a porous $SiO_2$ film 12 formed on the front surface of a transparent glass substrate 10 and has a reflecting film 36 made of Cr or Al formed on the rear surface of the transparent glass substrate 10. On substantially the entire rear surface of the reflecting film 36 is bonded a panel-like heater 42 by means of an adhesive or a bonding agent. Current is supplied to the heater 42 from a power source 44. If, for example, a PTC (positive characteristic thermister) panel heater is used as the panel-like heater 42, it can be directly driven by an automobile battery and, in this case, a temperature control circuit is unnecessary. The PTC panel heater is constructed of a polymeric sheet-like heat generating member (a conductive resin in which electrodes made of silver or copper are disposed and which is laminated by a PET film) imparted with the PTC characteristic. Water drops which are caused to spread in a thin film state by the $SiO_2$ film 12 are effectively removed (evaporated) by heating by the panel-like heater 42.

Figure 8:
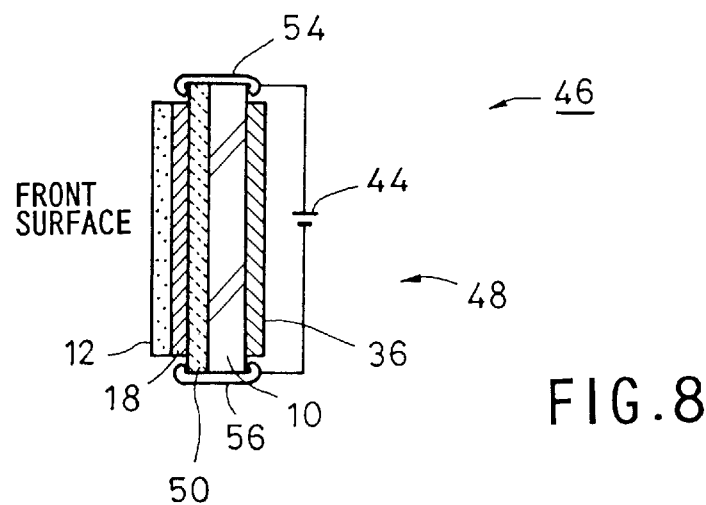
FIG. 8 is a sectional view showing an example (Example 3) in which the invention is applied to an automobile outer mirror.

(3) Example 3 (FIG. 8)

A mirror assembly 48 of an automobile outer mirror 46 has a transparent electrode film 50 made of, e.g., ITO, $TiO_2$ film 18 and porous $SiO_2$ film 12 formed on the front surface of a transparent glass substrate 10 and has a reflecting film 36 made of Cr or Al formed on the rear surface of the transparent glass substrate 10. Clip electrodes 54 and 56 are mounted in the upper and lower edge portions of the laminated transparent glass substrate 10 and transparent electrode film 50. By supplying current from a power source 44 to the transparent electrode film 50, the transparent electrode film 50 is heated and waterdrops which spread in a thin film state on the surface of the $SiO_2$ film can thereby be effectively removed.

Figure 9:
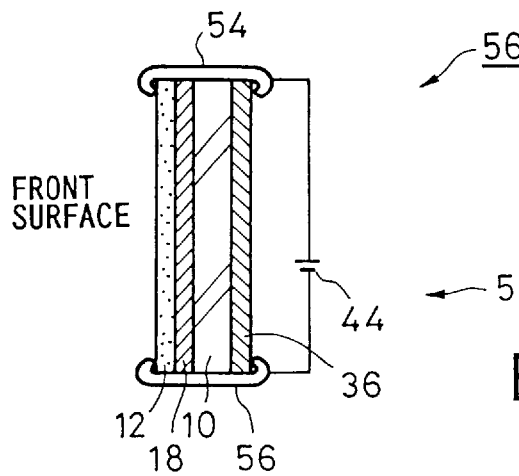
FIG. 9 is a sectional view showing an example (Example 4) in which the invention is applied to an automobile outer mirror.

(4) Example 4 (FIG. 9)

A mirror assembly 58 of an automobile outer mirror 56 has a $TiO_2$ film 18 and a porous $SiO_2$ film 12 formed on the front surface of a transparent glass substrate 10 and has a reflecting film 36 made of Cr or Al formed on the rear surface of the transparent glass substrate 10. Clip electrodes 54 and 56 are mounted in the upper and lower edge portions of the mirror assembly 58. By supplying current from a power source 44 to the reflecting film 36 (concurrently performing a function of a heat generating member), the reflecting film 36 is heated to effectively remove waterdrops which spread in a thin film state on the surface of the $SiO_2$ film.

Figure 10:
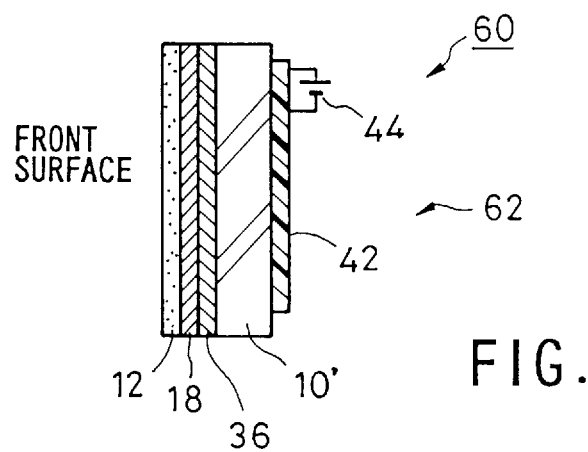
FIG. 10 is a sectional view showing an example (Example 5) in which the invention is applied to an automobile outer mirror.

(5) Example 5 (FIG. 10)

This automobile outer mirror 60 is constructed as a surface mirror (a mirror in which a reflecting film is formed on the front surface of a substrate). A mirror assembly 62 has a reflecting film 36 made of Cr or Al, a $TiO_2$ film 18 and a porous $SiO_2$ film 12 formed on the front surface of a glass substrate 10' (it is not necessary to be transparent) and has a panel-like heater 42 adhered or bonded to the rear surface of the glass substrate 10'. By supplying current from a power source 44 to the panel-like heater 42, the panel-like heater 42 is heated. Instead of the panel-like heater 42, the reflecting film 36 itself may be used as a heat generating member in the same manner as the example of FIG. 9.

Figure 11:
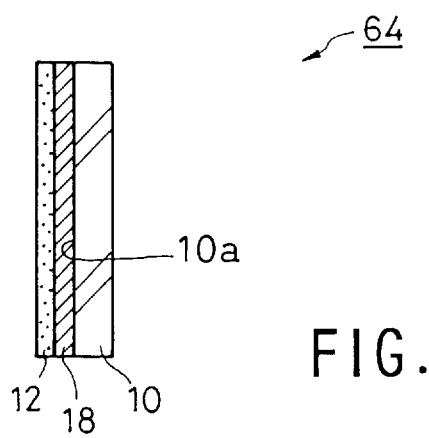
FIG. 11 is a sectional view showing an example (Example 6) in which the invention is applied to an automobile window.

(6) Example 6 (FIG. 11)

An automobile window 64 has a transparent glass substrate 10 which constitutes a window glass main body and on one surface 10a of which (either outside surface or inside surface) are formed a $TiO_2$ film 18 and a porous $SiO_2$ film, The window 64 is transparent in its entirety (with or without color). In case the $TiO_2$ film 18 and the porous $SiO_2$ film 12 are formed on the outside surface of the automobile, raindrops can be removed whereas in case these films 18 and 12 are on the inside surface of the automobile, deposition of waterdrops can be prevented.

Figure 12:
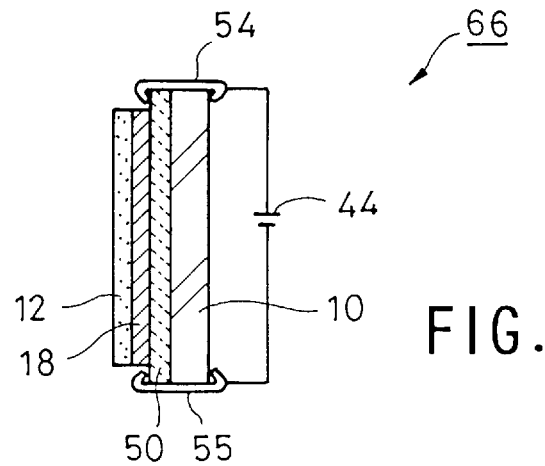
FIG. 12 is a sectional view showing an example (Example 7) in which the invention is applied to an automobile window.

(7) Example 7 (FIG. 12)

An automobile window 66 has a transparent glass substrate 10 which constitutes a window glass main body and on one surface 10a of which (either outside surface or inside surface) are formed a transparent electrode film 50 made of, e.g., ITO, a $TiO_2$ film 18 and a porous $SiO_2$ film 12. The window 66 is transparent in its entirety. Clip electrodes 54 and 56 are mounted in the upper and lower edge portions of the laminated transparent glass substrate 10a and transparent electrode film 50. By supplying current from a power source 44 to the transparent electrode film 50, the transparent electrode 50 is heated to effectively remove waterdrops which spread in a thin film state on the surface of the porous $SiO_2$ film 12.

Figure 13:
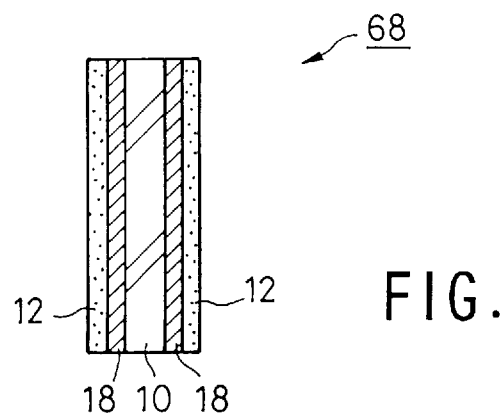
FIG. 13 is a sectional view showing an example (Example 8) in which the invention is applied to an automobile window.

(8) Example 8 (FIG. 13)

An automobile window 68 has a transparent glass substrate 10 on both surfaces of which are formed a $TiO_2$ film 18 and a porous $SiO_2$ film 12. The automobile window 68 thereby has the anti-fog property on both surfaces thereof. A transparent electrode film made of, e.g., ITO may be disposed between the surface of the transparent glass substrate 10 and the $TiO_2$ film 18.

Figure 14:
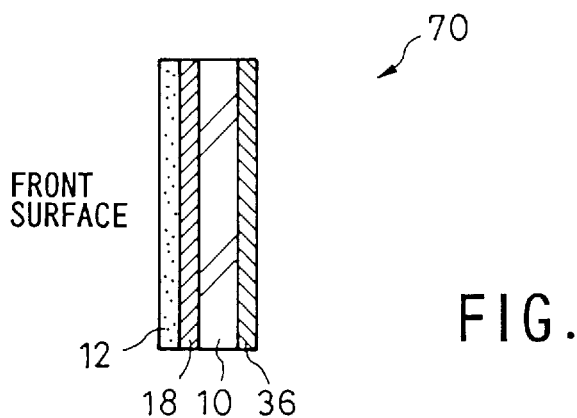
FIG. 14 is a sectional view showing an example (Example 9) in which the invention is applied to a bathroom mirror.

(9) Example 9 (FIG. 14)

A bath-room mirror 70 has a $TiO_2$ film 18 and a porous $SiO_2$ film 12 formed on the front surface of a transparent glass substrate 10 and has a reflecting film 36 made of Cr or Al formed on the rear surface of the transparent glass substrate 10. A heat generating member such as a panel-like heater, e.g., PTC may be disposed on the rear surface of the reflecting film 36. A transparent electrode film made of, e.g., ITO may be disposed between the transparent glass substrate 10 and the $TiO_2$ film 18.

In the above described examples, the substrate is made of a glass substrate but the substrate may be made of a material other than glass, for example, plastics.

What is claimed is:

1. An anti-fog element comprising:

a transparent substrate;

a transparent film of a photocatalyzer catalyzing a photocatalytic reaction formed on the transparent substrate; and a transparent porous inorganic oxide film formed on the film of the photocatalyzer as the outer layer of said anti-fog mirror which is exposed to the air and having a surface exhibiting a hydrophilic property wherein said transparent film of photocatalyzer is made of $TiO_2$ and said porous inorganic oxide film is made of $SiO_2$.

2. An anti-fog element as defined in claim 1 further comprising a transparent electrode film formed between the surface of the transparent substrate and the photocatalyzer film, said transparent electrode film being made electrically conductive.

3. An anti-fog element as defined in claim 1 which is transparent in its entirety and is constructed as an automobile window.

4. An anti-fog element as defined in claim 1 further comprising a reflecting film formed on a rear surface of the transparent substrate to form an anti-fog mirror.

5. An anti-fog element as defined in claim 4 adapted for use as an automobile outer mirror.

6. An anti-fog element as defined in claim 1 further comprising a reflecting film formed on a rear surface of the transparent substrate and a resistance heat generating element laminated on the rear surface of the reflecting film to form an anti-fog mirror, said resistance heat generating element being made electrically conductive.

7. An anti-fog element as defined in claim 6 adapted for use as an automobile outer mirror.

8. An anti-fog element as defined in claim 1 further comprising a reflecting film formed on a rear surface of the transparent substrate to form an anti-fog mirror, said reflecting film being made electrically conductive and constituting a resistance heat generating element.

9. An anti-fog element as defined in claim 8 adapted for use as an automobile outer mirror.

10. An anti-fog element as defined in claim 1 wherein the $TiO_2$ film has an anatase structure.

11. An anti-fog mirror comprising:

a substrate;

a reflecting film formed on the front surface of said substrate;

a transparent film of a photocatalyzer catalyzing a photocatalytic reaction formed on said reflecting film; and a transparent porous inorganic oxide film formed on the film of the photocatalyzer as the outer layer of said anti-fog mirror which is exposed to the air said photocatalyzer having a surface exhibiting a hydrophilic property wherein said transparent film of photocatalyzer is made of $TiO_2$ and said porous inorganic oxide film is made of $SiO_2$.

* * * * *